No. 663,253. Patented Dec. 4, 1900.
G. W. BOWMAN.
FRUIT GATHERING BAG.
(Application filed Apr. 12, 1900.)
(No Model.)
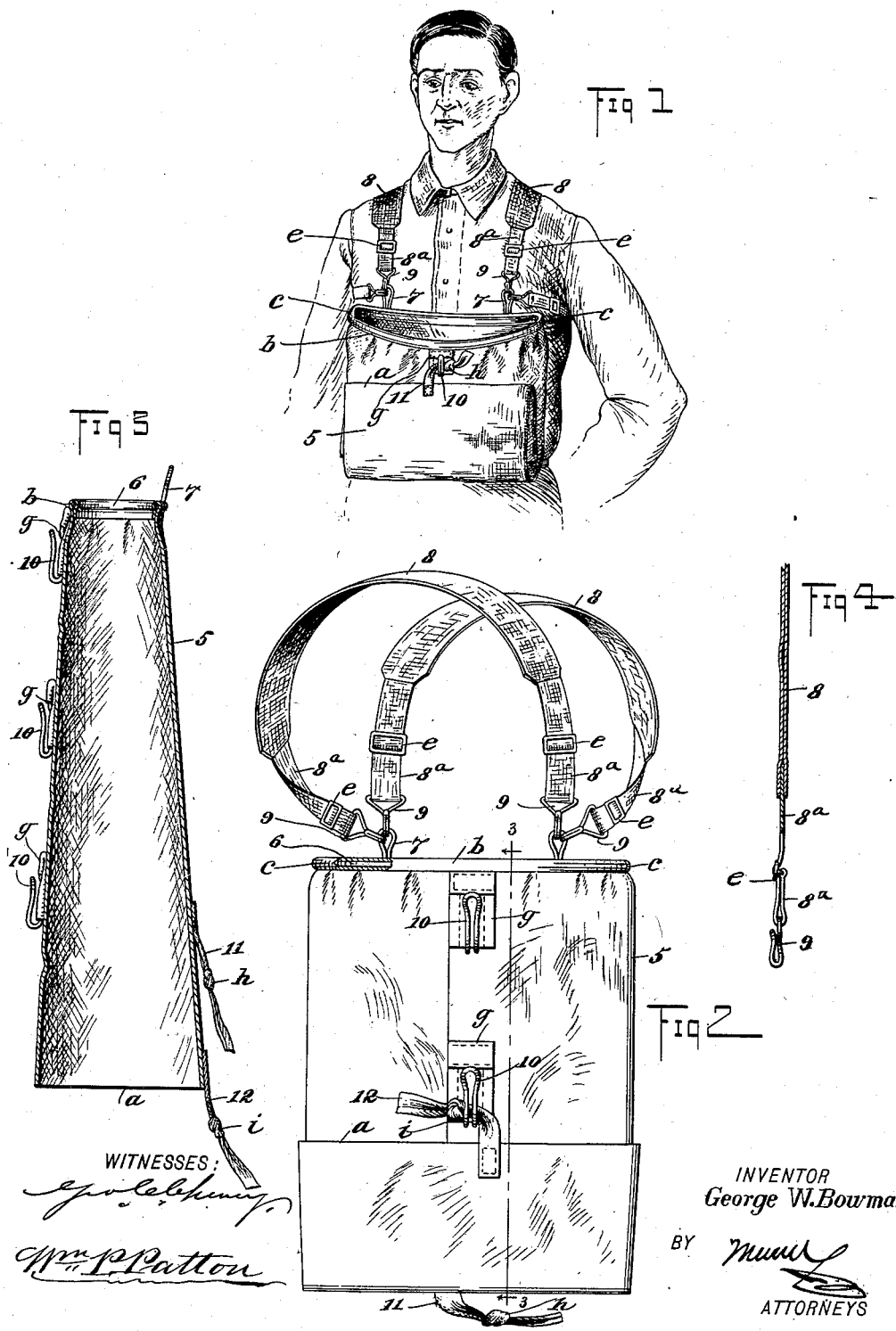
WITNESSES:
INVENTOR
George W. Bowman.
BY
ATTORNEYS
THE NORRIS PETERS CO., PHOTO-LITHO., WASHINGTON, D. C.

UNITED STATES PATENT OFFICE.

GEORGE WALACE BOWMAN, OF PALISADE, COLORADO.

FRUIT-GATHERING BAG.

SPECIFICATION forming part of Letters Patent No. 663,253, dated December 4, 1900.

Application filed April 12, 1900. Serial No. 12,540. (No model.)

*To all whom it may concern:*

Be it known that I, GEORGE WALACE BOWMAN, a citizen of the United States, and a resident of Palisade, in the county of Mesa and State of Colorado, have invented a new and Improved Fruit-Gathering Bag, of which the following is a full, clear, and exact description.

This invention relates to portable bags used by persons gathering fruit from trees or bushes, and has for its object to provide a novel, simple, and inexpensive device of the indicated character which is very convenient in use, is adjustable in length, so that fruit placed therein need not be dropped and bruised, is adapted for change in position on the person of the user, and affords means for the quick discharge of fruit therefrom without bruising or otherwise injuring the fruit.
The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a perspective view of the improvement in place on the person of the user and showing the first adjustment of the bag for reception of fruit as it is picked by hand. Fig. 2 is an enlarged detached front view of the device, showing it adjusted to increase its holding capacity. Fig. 3 is a transverse sectional view of the bag fully extended for discharge of fruit therefrom, the view being taken substantially on the line 3 3 in Fig. 2; and Fig. 4 is a transverse sectional view of an end portion of one of the bag-supporting bands.

In hand-picking of fruit of different varieties from trees it is very essential when a bag is employed as a receptacle for the fruit that the bag should be hung from the neck of the picker, so that both hands may be employed in the operation of gathering the fruit. Many kinds of fruit when ripe, or nearly so, become injured and rendered liable to decay quickly if the fruit is bruised in handling or placing as gathered in the temporary receptacles. In the invention herein described I have obviated in a simple and practical manner the liability of injuring fruit as it is being gathered.

Referring to the drawings, which represent an embodiment of my invention, 5 indicates the body of the fruit-gathering bag. The bag 5 is made of canvas or other suitable pliable material and is afforded a proper length for effective service, as hereinafter explained. The tubular bag 5 is preferably contracted gradually from the open lower end $a$ thereof to the upper end, thus giving a somewhat-increased diameter internally to the lower end, which will greatly facilitate the discharge of fruit therefrom, as will be further explained.

The upper end of the bag-body 5 is double-folded and hemmed at the edge where folded, thus producing a stout casing $b$, wherein a distending-hoop 6 is held. The hoop 6 is preferably given a concave form at the side nearest the wearer in service, so as to fit upon his person, and the opposite or outer side of the distending-hoop is rendered convex or bowed outwardly, which affords a suitable mouth-opening at the upper end of the bag, as indicated in Figs. 1 and 3.

Upon the concave side of the hoop 6 two eyes or loops 7 are formed or secured and are respectively positioned near the ends $c$ of the hoop, and said loops are so spaced apart as to correctly position them for engagement with hooks that are connected with the forward ends of two bag-supporting bands 8, as presently explained. As best shown in Fig. 2, the bands 8 are duplicates of each other, and each consists of a broad intermediate portion of suitable length and thickness, having end portions $8^a$ secured thereon, preferably of less width, the entire length of each band being rendered adjustable by the friction-slides $e$, of ordinary construction.

In the looped ends of the band portions $8^a$ bights of the hooks 9 are loosely held, which hooks are designed to engage with the loops or eyes 7. As shown in Fig. 2, the supporting-bands 8 are normally crossed, so that the hooks 9 on one end of each band extension $8^a$ will engage with one loop 7, and the opposite ends of the bands have the hooks 9 thereon engaged with the remaining loop or eye 7.

By the described construction and arrangement of parts it will be seen that the doubled portions at the centers of the two bands 8 are adapted to be engaged by the shoulders of the wearer of the bag, one end portion 8ᵃ of each band depending therefrom, as shown in Fig. 1, while opposite ends 8ᵃ pass below the armpits and have their hooks 9 engaged laterally with the loops or eyes 7, as shown in the same figure and more plainly in Fig. 2.

Upon the front face of the bag 5 at its center of width three similar hooks 10 are secured, the points of said hooks projecting toward the upper end of the bag, as best shown in Fig. 3, and preferably the widened flat end portions of the hook-bodies are secured upon the bag at proper distances apart by placing reinforce-patches *g* over these hook ends and sewing through the patches and bag, so as to incase each widened hook end, as indicated by dotted lines in Fig. 2.

One of the three hooks 10 is positioned centrally on the front side of the bag 5 below and near the hoop 6. The second hook 10 is located one-third the length of the bag below said hoop and the remaining hook one-third the length of the bag above the lower open end thereof, all the hooks being in the same vertical plane.

Upon the rear face of the bag 5 at its center of width a securing-tab 11 is affixed at one end, said attached end of the tab being nearly opposite the lowermost hook 10 on the front face of the bag, as shown in Fig. 3. Preferably the tab 11 is formed of fibrous material and may be a doubled strip of canvas or a piece of rope of proper thickness, and in said tab a knot *h* is formed, which will serve as a keeper if the tab is drawn into the hook 10, which is directly below the hoop 6 and with which said tab is designed to engage. Upon the rear face of the bag 5 at its transverse center and near the lower edge thereof another tab 12, similar to the tab 11, is secured at its upper end, as shown in Figs. 2 and 3, the knot *i* thereon being designed to interlock with either the lowermost hook 10 or the one next above said lower hook.

In operation the fruit-picker when commencing work may with advantage place the bag 5 at the front of his person and hold it thereon positioned with the open mouth thereof just below his armpits by engaging the loops of the bands 8 with his shoulders, as shown in Fig. 1. When commencing work, to prevent bruising the picked fruit when placing it quickly in the bag 5 the latter should be double-folded, as shown in Fig. 1, and secured thus folded by engaging the knotted tab 11 with the uppermost hook 10, as represented in said figure.

It will be seen that the bag 5 will when double-folded, as described, become so shortened as to permit the placing of the fruit as picked gently and quickly therein without dropping the same, and thus avoid the slightest danger of bruising the fruit. After the operator has filled the shortened bag 5 he may quickly lengthen the same by releasing the knotted tab 11 from the uppermost hook 10 and engaging the knotted tab 12 with the intermediate hook 10, as shown in Fig. 2, which will double the holding capacity of the bag, when picking may again be resumed and continued until the lengthened bag is full.

In case the operator is in a position at or on a tree which renders descent therefrom difficult if the filled bag is positioned in front of him, as described, he can readily release one of the bands 8 from the shoulder it rests upon, and thus permit the bag to be shifted to a position beneath the armpit of the shoulder from which the band has been removed, and it is obvious that this change in position of the bag may be effected to place it below either arm, as may be desired.

After descent from the tree the filled bag may be emptied without bruising the fruit it contains by lowering the bag so that it will enter a barrel, basket, or other receptacle and then opening the lower end of said bag by the release of the tab 12 from the engaged hook 10, retaining the tab in hand, so that the opening of the bottom end of the bag will be gradual, and thus permit the escape of fruit in a like manner.

In case the capacity of the bag is too small, which may happen if the operator is working upon or near the ground, it may be increased by doubling over the lower end of the bag and interlocking the tab 12 with the lowermost hook 10, which will obviously lengthen the bag while effecting a closure of its lower end.

Owing to the peculiar construction of the improved fruit-gathering bag hereinbefore described a picker can work with ease, support a considerable quantity of fruit without strain or excessive fatigue, increase the capacity of the bag while in position for fruit-gathering, place the fruit in the bag without injury thereto, and quickly discharge the fruit therefrom in a safe manner.

Having thus described my invention, I claim as new and desire to secure by Letters Patent—

1. A fruit-gathering bag, comprising a tubular receptacle open at both ends, a plurality of hooks secured at spaced intervals on the front side of the bag and all in the same vertical plane, a tab secured on the rear side of the bag near the lower edge, and a second tab secured on the rear side of the bag above the first tab, the attached end of said second tab being nearly opposite the lowermost hook on the front of the bag, the said tabs being adapted to engage the said hooks to change the length of the bag and close its lower end, substantially as specified.

2. A fruit-gathering bag comprising a tubular pliable receptacle open at both ends, a distending-hoop at the upper end, a plurality of hooks secured at spaced intervals on the front side of the bag, one above the other, a securing-tab attached at one end to the rear face of the bag at a point nearly opposite the lowermost hook on the front face of the bag and adapted to engage with the uppermost hook on the front of the bag to hold the bag-body double-folded, a second tab secured to the rear face of the bag near the lower edge thereof, and adapted to engage either of the other hooks on the face of the bag, to hold the bag-body single-folded, and means for hanging the bag from the neck of the user, substantially as specified.

3. A fruit-gathering bag, comprising a tubular, pliable receptacle open at each end, a distending-hoop at the open upper end, means for holding the bag-body double-folded or single-folded to give it different lengths and close the lower end thereof, eyes or loops on the rear side of the distending-hoop near the ends, and supporting-bands normally crossed and having hooks at each end, the hooks on one end of each band engaging with one of the said eyes or loops on the distending-hoop, and the hooks on the opposite ends of the bands engaging with the other eye or loop on the hoop, substantially as specified.

4. A fruit-gathering bag, open at each end, spaced eyes or loops at the rear side of the bag at the upper open end, and adjustable supporting-bands, having hooks at each end the bands being normally crossed, the hooks at one end of each band engaging one of said eyes or loops and the hooks at the other ends of the bands engaging the other eye or loop, substantially as specified.

In testimony whereof I have signed my name to this specification in the presence of two subscribing witnesses.

GEORGE WALACE BOWMAN.

Witnesses:
MARION O. DELOPLAIN,
ALVIN E. BORSCHELL.